United States Patent
Tanaka et al.

[15] 3,639,210
[45] Feb. 1, 1972

[54] FERMENTATION PROCESSES UTILIZING GASEOUS HYDROCARBONS

[72] Inventors: Katsunobu Tanaka, Machida-shi; Kazuo Ohshima, Tokyo; Kazuo Kimura; Masaki Yamamoto, both of Machida-shi, all of Japan

[73] Assignee: Kyowa Hakko Kogyo Co., Ltd., Tokyo, Japan

[22] Filed: May 2, 1968

[21] Appl. No.: 726,228

[30] Foreign Application Priority Data

May 15, 1967 Japan.................................42/30402

[52] U.S. Cl. ...........................................................195/28 R
[51] Int. Cl. .................................................................C12d 13/06
[58] Field of Search ...............................................195/28, 29

[56] References Cited

UNITED STATES PATENTS

| | | | |
|---|---|---|---|
| 3,222,258 | 12/1965 | Iizuka et al. | 195/29 |
| 3,384,491 | 5/1968 | Guenther et al. | 195/28 X |
| 3,409,506 | 11/1968 | Stevens et al. | 195/28 |
| 3,414,477 | 12/1968 | Douros et al. | 195/28 |

FOREIGN PATENTS OR APPLICATIONS 6,612,504  3/1967  Netherlands

*Primary Examiner*—A. Louis Monacell
*Assistant Examiner*—Seymour Rand
*Attorney*—Craig, Antonelli & Hill

[57] ABSTRACT

A process for producing organic compounds, such as for example, amino acids, various organic acids, vitamins, saccharides, nucleic acid-related substances, cells of micro-organisms, and the like, which comprises culturing a micro-organism capable of producing said organic compounds in an aqueous nutrient medium under aerobic conditions and in the present of gaseous hydrocarbons as the main carbon source. Hydrocarbon-assimilating strains of the genus *Brevibacterium*, preferably *Brevibacterium ketoglutamicum*, are employed.

7 Claims, No Drawings

FERMENTATION PROCESSES UTILIZING GASEOUS HYDROCARBONS

The present invention relates to a process for producing various useful substances, such as for example, organic acids, amino acids, vitamins, saccharides, nucleic acid-related substances, cells of micro-organisms and the like. More particularly, the present invention is directed to a process for producing various useful substances wherein fermentation is effected in an aqueous nutrient medium under aerobic conditions and in the presence of gaseous hydrocarbons as the main carbon source.

One of the objects of the present invention is to provide an improved process for producing useful substances such as amino acids, organic acids, vitamins, saccharides, nucleic acid-related substances and cells of micro-organisms.

Another object of the present invention is to provide a process for producing said useful substances by fermentation in the presence of gaseous hydrocarbons as the main carbon source which may be carried out in an efficacious and simple manner.

A further object of the present invention is to provide a fermentation process which is inexpensive relative to known processes and effective in producing a high yield of product.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The utilization of various hydrocarbons as an inexpensive source of carbon in fermentation processes together with other starting materials has recently become very interesting. The present inventors have directed their attention to the utilization of gaseous hydrocarbons, particularly butane, which are the most inexpensive of the hydrocarbons and which can be supplied in abundance. As a result of various investigations and experimentations, it has been found that hydrocarbon-assimilating strains of micro-organisms, especially those micro-organisms belonging to the genus *Brevibacterium* are excellent in the utilizability of gaseous hydrocarbons such as butane as the main carbon source in the fermentation medium. It has been found that when strains such as *Brevibacterium* are used, various useful fermentation products, such as for example, amino acids, organic acids, saccharides, nucleic acids, vitamins and cells of micro-organisms, are produced when using gaseous hydrocarbons as the main carbon source.

As to the utilization of gaseous hydrocarbons, investigations have been reported with respect to the production of proteins from micro-organism cells utilizing methane. Also, a patent using high pressure resistant strains, that is, Japanese Pat. Publication No. 20,665/65, has been submitted by Wakagi et al. However, no literature has been found which discloses that substances such as amino acids and similar useful substances can be produced by fermentation at about atmospheric pressure using gaseous hydrocarbons as the main carbon source.

The advantages of the present fermentation as compared with conventional fermentation processes using saccharides as starting materials and those recently developed fermentation processes using liquid hydrocarbons as the carbon source in the fermentation medium are as follows:

1. The gaseous hydrocarbons are abundant and inexpensive,
2. The storage, transportation and feeding of the gaseous hydrocarbons to the culture medium are relatively simple,
3. The recovery of the residual gaseous hydrocarbons from the fermentation medium can be readily effected,
4. The control and management of the concentration of the gaseous hydrocarbon source during fermentation is readily accomplished, and,
5. The fermentation liquor after completion of the fermentation is clear, and thus separation thereof from residual starting materials and purification thereof are readily effected.

In fermentations using gaseous hydrocarbons as the main carbon source, it is also possible to directly apply various fermentation procedures normally employed in conventional fermentations using saccharides or liquid hydrocarbons. However, in order to effectively increase the proportions of gaseous hydrocarbons dissolved in the fermentation medium, small amounts of nonutilizable liquid hydrocarbons or a substance similar in effect thereto and a surface active agent are added to the fermentation medium, whereby the fermentation rate can be substantially enhanced.

Micro-organisms which can be used in the process of the present invention are hydrocarbon-assimilable strains, particularly those belonging to the genus *Brevibacterium*, The process of the present invention is particularly applicable to the micro-organism *Brevibacterium ketoglutamicum*, ATCC No. 15,587.

As for the fermentation per se, either a synthetic culture medium or a natural nutrient medium is suitable as long as it contains the essential nutrients for the growth of the micro-organism strain employed. Such nutrients are well known in the art and include substances such as a carbon source, a nitrogen source, inorganic compounds and the like which are utilized by the micro-organism employed in appropriate amounts. A hydrocarbon gas such as methane, ethane, propane, n-butane, iso-butane, propylene, butylene, and the like, as well as mixtures of these materials, is used in the fermentation process of the present invention as the main carbon source. Small amounts of other carbon sources may also be present in the fermentation medium, such as for example, liquid hydrocarbons including straight and branched-chain paraffins (alkanes) having from 5 to 24 carbon atoms, such as n-pentane, n-octane, n-decane, etc., carbonhydrates such as glucose, fructose, maltose, sucrose, starch, starch hydrolysates, molasses, etc., or any other suitable carbon source such as glycerol, mannitol, sorbitol, organic acids, glutamic acid, etc. these substances may be used either alone or in mixtures of two or more but in small amounts when compared to the primary source of carbon, that is the hydrocarbon gases mentioned above. As a nitrogen source, various kinds of inorganic or organic salts or compounds, such as urea, ammonia or ammonium salts such as ammonium chloride, ammonium sulfate, ammonium nitrate, ammonium phosphate, etc., or one or more than one amino acid mixed in combination, or natural substances containing nitrogen, such as corn steep liquor, yeast extract, meat extract, peptone, fish meal, bouillon, N-Z-Amine (trademark for a series of casein hydrolysates), casamino acid, fish solubles, rice bran extract, ribonucleic acid, etc., may be employed. Again these substances may be used either singly or in combinations of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc.

As is conventional in the art, growth-promoting agents such as biotin or amino acids such as glutamic acid or aspartic acid may be added to the medium.

The fermentation employed herein is conducted under aerobic conditions, such as aerobic shaking of the culture or with stirring of a submerged culture, at a temperature of about 20° to 50° C. and at a pH of about 4 to 9.

The amino acids as produced in the present invention are intended to include those commonly found in proteins, such as for example, glutamic acid, valine, lysine, etc., as well as those shown to occur in nature such as for example, alanine. The process of the present invention is thus directed to producing the amino acids of the type discussed in chapter 7 of the "Principles of Biochemistry" by White, Handler, Smith and Stetten, Second Edition, McGraw-Hill, (1959).

The saccharides which can be produced by the present process are discussed in chapter 6 of the above-identified reference book and include compounds such as glucose, trehalose and the like. Vitamins such as riboflavin, organic acids such as citric acid and nucleic acid-related substances such as adenosine-5'-phosphate, adenosine diphosphate and adenosine triphosphate and other related compounds can also be produced by the process of the present invention.

For the formation of amino acid and nucleic acid-related substances, it is desirable that a substantial amount of the nitrogen source be supplied to the fermentation medium. Furthermore, the addition of various antibiotics, surface active agents, fatty acids, alcohols or other related substances is also effective. The formation of saccharides is generally effected under the same conditions as in the case where amino acids are formed. When producing organic acids, it is desirable if the supply of nitrogen source to the fermentation medium is small.

The following examples are given merely as illustrative of the present invention and are not to be considered as limiting. Unless otherwise noted, the percentages therein are by weight.

EXAMPLE I 20 ml. of the following culture medium is prepared in a 250 ml. triangular flask:

2% $NH_4NO_3$
0.05% $Na_2HPO_4·12H_2O$
0.05% $KH_2PO_4$
0.01% $MgSO_4·7H_2O$
0.001% $MnSO_4·4H_2O$
0.001% $FeSO_4·7H_2O$
0.001% $ZnSO_4·7H_2O$
0.001% $CaCl_2·2H_2O$
50γ11 $CuSO_4·5H_2O$
10γ11 $H_3BO_3$
10γ11 $Na_2MoO_4·2H_2O$
0.1% corn steep liquor The pH of this medium is 7.0.

Brevibacterium ketoglutamicum 15,587, previously cultured with aerobic shaking in a bouillon medium, is inoculated into the culture medium and said medium is subjected to shaking at a temperature of 30° C. by means of a thermostatic stirrer. Culturing is conducted by supplying to the culture medium a mixed gas of n-butane and air having a butane gas concentration in the gas mixture of about 50 percent by volume. Unused butane gas can be recycled and fresh butane gas can be added to the culture medium such that the butane concentration in the culture medium is always about 50 percent by volume. On the 3rd day of the cultivation, 0.1 percent of cetyl trimethyl ammonium bromide is added and the cultivation is continued for an additional 4 days. After said period, 0.30 g./dl. of L-glutamic acid, 0.12 g./dl. of alanine, 0.05 g./dl. of valine, and 0.001 g./dl. of lysine are produced in the culture medium.

The same cultivation is effected using 50 triangular flasks of 250 ml. in volume, and the liquors after cultivation are united and separated from the cells of the micro-organisms by centrifugal separation to form a cultivation-completed liquor. One liter of this liquor is adjusted to a pH of about 2.0 by the addition of hydrochloric acid, and is adsorbed on the cation exchange resin, Amberlite IR 120 (H-type), and the individual amino acids are separated and eluted by successively elevating the pH. After concentration, 2.2 g. of L-glutamic acid, 0.8 g. of alanine, 0.4 g. of valine and 5 mg. of lysine are obtained. In addition, 4 g. of dry cells of the micro-organism are recovered.

EXAMPLE II

Brevibacterium ketoglutamicum 115,587, is inoculated into the same culture medium as in example I, and is subjected to the same culturing conditions as in example I. At the 24th hour of cultivation, 50 units/ml. of penicillin G is added and the cultivation is continued for 6 additional hours whereby 0.45 g./dl. of L-glutamic acid, 0.1 g./dl. of trehalose and 0.001 g./dl. of glucose are produced.

EXAMPLE III

Brevibacterium ketoglutamicum ATCC 15,587, is inoculated into a culture medium having the same composition as in example I except that the concentration of $NH_4NO_3$ is varied to 0.2 percent and the concentration of corn steep liquor is varied to 0.01 percent. The culture medium is subjected to shaking for 7 days in the same manner as in example I. As a result, 0.3 g./dl. of α-ketoglutaric acid and 0.001 g./dl. of citric acid are produced in the culture medium.

EXAMPLE IV

Fermentation is effected in the same manner as in example II wherein 5 γ/ml. of riboflavin is produced in the fermentation liquor.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for producing organic compounds selected from the group consisting of L-glutamic acid, alanine, valine, trehalose, glucose, α-ketoglutaric acid, citric acid and riboflavin which comprises culturing the micro-organism Brevibacterium ketoglutamicum ATCC 15,587 in an aqueous nutrient medium under aerobic conditions and in the presence of at least one gaseous hydrocarbon as the main carbon source, accumulating said organic compounds in the resultant culture liquor, and recovering the organic compounds therefrom.

2. The process of claim 1, wherein the nutrient medium contains a substantial supply of nitrogen to produce said amino acids and saccharides.

3. The process of claim 1, wherein the nutrient medium contains a small supply of nitrogen to produce said organic acids.

4. The process of claim 1, wherein the hydrocarbon gas is selected from the group consisting of methane, ethane, propane, n-butane, iso-butane, propylene and butylene.

5. The process of claim 1, wherein the gaseous hydrocarbon is n-butane.

6. A process for producing organic compounds selected from the group consisting of L-glutamic acid, alanine, valine, trehalose, glucose, α-ketoglutaric acid, citric acid and riboflavin which comprises culturing the micro-organism Brevibacterium ketoglutamicum ATCC 15,587 in an aqueous nutrient medium under aerobic conditions at a temperature of about 20° to 50° C. and at a pH of about 4.0 to 9.0 in the presence of at least one gaseous hydrocarbon as the main carbon source, accumulating said organic compounds in the resultant culture liquor, and recovering the organic compounds therefrom.

7. The process of claim 6, wherein the gaseous hydrocarbon is n-butane.

* * * * *